(12) United States Patent
Patil et al.

(10) Patent No.: US 10,070,316 B2
(45) Date of Patent: Sep. 4, 2018

(54) PERMISSION DELEGATION FRAMEWORK

(71) Applicant: Samsung Electronics Co., Ltd, Suwon-si (KR)

(72) Inventors: Sanjay Patil, Milpitas, CA (US); Karthik Balakrishnan, Milpitas, CA (US); Dushyant Vipradas, Fremont, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/230,299

(22) Filed: Aug. 5, 2016

(65) Prior Publication Data

US 2017/0366974 A1 Dec. 21, 2017

Related U.S. Application Data

(60) Provisional application No. 62/351,138, filed on Jun. 16, 2016.

(51) Int. Cl.
| | |
|---|---|
| *H04M 3/16* | (2006.01) |
| *H04W 12/08* | (2009.01) |
| *H04W 4/00* | (2018.01) |
| *H04W 4/50* | (2018.01) |

(52) U.S. Cl.
CPC ........... *H04W 12/08* (2013.01); *H04W 4/001* (2013.01); *H04W 4/50* (2018.02)

(58) Field of Classification Search
CPC ........ H04L 63/20; H04W 12/08; H04W 12/02
See application file for complete search history.

(56) References Cited

U.S. PATENT DOCUMENTS

| | | |
|---|---|---|
| 7,137,114 B2 | 11/2006 | Rich et al. |
| 8,166,291 B2 | 4/2012 | Natsuno et al. |
| 8,826,436 B2 | 9/2014 | Kreiner et al. |
| 9,059,974 B2 | 6/2015 | Kim et al. |
| 9,065,771 B2 | 6/2015 | Bender et al. |
| 9,204,240 B2 | 12/2015 | Musfeldt et al. |
| 9,213,830 B2 | 12/2015 | Achutha et al. |

(Continued)

FOREIGN PATENT DOCUMENTS

| | | |
|---|---|---|
| EP | 1 732 007 A1 | 12/2006 |
| WO | WO 2014/126574 A1 | 8/2014 |
| WO | WO 2015/015499 A1 | 2/2015 |

OTHER PUBLICATIONS

Samsung Knox White Paper: An Overview of the Samsung Knox Platform, Sep. 2015, 23 pages.

(Continued)

*Primary Examiner* — Khalid Shaheed
*Assistant Examiner* — K Wilford

(57) ABSTRACT

A mobile device includes a memory having at least one delegated administrator stored thereon, the delegated administrator is configured to apply a policy to the mobile device based on at least one permission a delegated administrator configured to apply a policy to the mobile device based on the at least one permission. The mobile device also includes at least one processor having a mobile device management (MDM) framework. The MDM framework receives the at least one permission from the device administrator, delegates the at least one permission to the delegated administrator, and enforces the policy on the mobile device.

20 Claims, 5 Drawing Sheets

(56) References Cited

U.S. PATENT DOCUMENTS

| | | | |
|---|---|---|---|
| 9,271,142 B1* | 2/2016 | Broch | H04L 41/0813 |
| 2009/0049518 A1 | 2/2009 | Roman et al. | |
| 2010/0275029 A1 | 10/2010 | Little et al. | |
| 2013/0160013 A1* | 6/2013 | Pires | G06F 21/41 |
| | | | 718/1 |
| 2014/0245397 A1* | 8/2014 | Lim | G06F 21/10 |
| | | | 726/4 |
| 2014/0297838 A1 | 10/2014 | Qureshi | |
| 2014/0298420 A1* | 10/2014 | Barton | H04L 63/10 |
| | | | 726/4 |
| 2015/0026827 A1 | 1/2015 | Kao et al. | |
| 2015/0036827 A1 | 2/2015 | Rosset et al. | |
| 2015/0082458 A1 | 3/2015 | Cooper et al. | |
| 2015/0235042 A1 | 8/2015 | Salehpour et al. | |
| 2015/0278488 A1 | 10/2015 | Batchu et al. | |
| 2015/0296368 A1 | 10/2015 | Kaufman et al. | |
| 2015/0332023 A1 | 11/2015 | Gisolfi et al. | |
| 2015/0365416 A1 | 12/2015 | Narayanan et al. | |
| 2016/0197909 A1* | 7/2016 | Innes | H04L 63/0807 |
| | | | 726/6 |

OTHER PUBLICATIONS

International Search Report and Written Opinion for International Application No. PCT/KR2017/005924, dated Sep. 18, 2017. (14 pages).

\* cited by examiner

US 10,070,316 B2

PERMISSION DELEGATION FRAMEWORK

CROSS-REFERENCE TO RELATED APPLICATION AND CLAIM OF PRIORITY

This application claims priority under 35 U.S.C. § 119(e) to U.S. Provisional Patent Application No. 62/351,138 filed on Jun. 16, 2016. The above-identified provisional patent application is hereby incorporated by reference in its entirety.

TECHNICAL FIELD

This disclosure relates generally to mobile device management. More specifically, this disclosure relates to managing permissions for one or more applications installed on a mobile device.

BACKGROUND

Mobile devices provide wireless communication between users. As technology has advanced, mobile devices now provide many additional features beyond a simple telephone conversation. For example, mobile devices are now able to provide additional functions such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and many more. With the plurality of features now provided, a mobile device has effectively become a necessity of daily life.

Employees of an enterprise, such as a company, educational institution, government agency, or the like, may be issued devices, such as portable phones or pagers, by the enterprise. This allows the enterprise to control the security of the devices. With the development and proliferation of smartphones, users are using their own mobile devices instead of relying upon enterprise-issued devices. In these cases, the user's mobile device has a container installed therein which allows the enterprise to control the security of the container.

SUMMARY

This disclosure provides a permission delegation framework for use in a mobile device.

In a first embodiment, a mobile device includes a memory having at least one delegated administrator stored thereon, the delegated administrator is configured to apply a policy to the mobile device based on at least one permission. At least one processor includes a mobile device management (MDM) framework configured to receive the at least one permission, delegate the at least one permission to the delegated administrator, and enforce the policy on the mobile device.

In a second embodiment, a method for managing a mobile device using a mobile device management (MDM) framework includes obtaining at least one permission through the MDM framework. The at least one permission is delegated, by the MDM framework, to at least one delegated administrator. A policy is applied, by the at least one delegated administrator, to the MDM framework based on the at least one permission and the policy is enforced on the mobile device using the MDM framework.

In a third embodiment, a non-transitory computer-readable medium comprising instructions stored thereon for managing a mobile device using a mobile device management (MDM) framework when executed by at least one processor, causes a mobile device to delegate at least one permission to at least one delegated administrator of the mobile device. A policy is applied, by the at least one delegated administrator, to the MDM framework based on the at least one permission and the policy is enforced on the mobile device using the MDM framework.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 6, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged mobile device.

The embodiments described herein permit a device administrator, which has acquired permissions on a mobile device, to delegate one or more permissions to a $3^{rd}$ party application or delegated administrator to aid in managing the mobile device.

Figure 1:
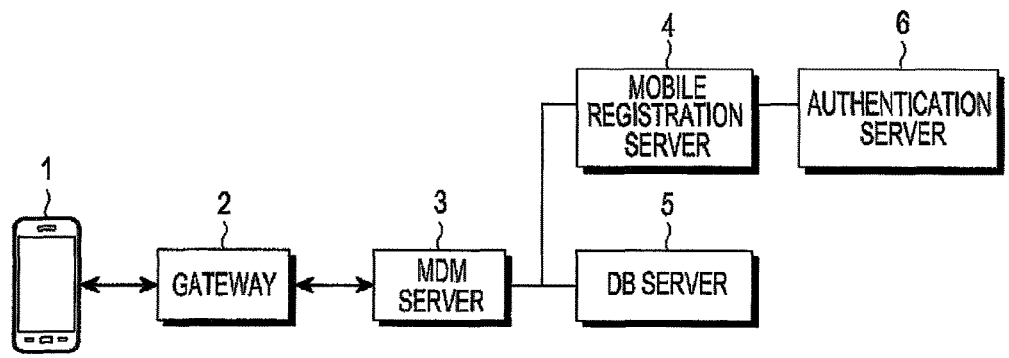
FIG. 1 illustrates an example of a Mobile Device Management (MDM) solution according to this disclosure.

FIG. 1 illustrates a Mobile Device Management (MDM) solution system according to an embodiment of the present disclosure.

Referring to FIG. 1, the MDM solution can include an mobile device 1, a gateway 2, an MDM server 3, a mobile registration server 4, a database server 5, and an authentication server 6.

The mobile device 1 can download a specific application, and install the downloaded application. In addition, the mobile device 1 can be driven based on an Operating system (OS), and can manage an application based on an OS driving method. For example, the mobile device 1 can manage the application based on various OS driving methods including Android®, iOS®, Blackberry®, Windows Mobile®, Symbian®, Samsung Bada®, and the like. An application can be a general term for programs that can be executed in the various operating systems as described above. The mobile device 1 can identify permission related to Application Programming Interface (API) paging that an application requires. Meanwhile, the mobile device 1 can restrict some API permissions required by an application from being provided, based on a security policy established by the MDM server. Accordingly, a user of the mobile device 1 may not use some functions of the application under the MDM solution, and therefore internal security can be enhanced.

Meanwhile, the mobile device 1 does not perpetually use the API permission initially approved by the MDM solution. The mobile device 1 can periodically or aperiodically inquire a server of a terminal manufacturing company as to whether a license key is valid. The mobile device 1 can reset the API permission that will be approved, based on a responded Right Object (RIO) according to whether the license key is valid. Accordingly, the permission can be dynamically set.

The mobile device 1 can be implemented as a smart phone or a tablet Personal Computer (PC), and a structure of the mobile device 1 will be more specifically described below with reference to FIG. 6.

The mobile device 1 can perform communication with the gateway 2. The gateway 2 can manage a communication connection between the mobile device 1 and the MDM server 3, and can perform a connection through a mobile Virtual Private Network (VPN) and a public mobile communication network. The gateway 2 can perform functions of the communication connection between the mobile device 1 and the MDM server 3, authentication, encryption, communication encryption, and user authentication based on a certificate in the mobile VPN (Internet Protocol Security (IPSec) communication encryption). More specifically, the gateway 2 can include a storage module that stores an electronic signature certificate, a mobile VPN policy engine that sets a VPN policy, a VPN driving agent, a mobile VPN driver, and the like.

In some embodiments, the MDM server 3 may act as an administration server for managing the mobile device 1 and can change environment settings of the mobile device and other MDM related systems, or can apply a distribution and a patch of security software. More particularly, the MDM server 3 can store a security policy established by an administrator. The MDM server 3 can control permission contrary to the established security policy. For example, the MDM server 3 can restrict camera related API permission, or can monitor an operation of the mobile device 1. The MDM server may manage the mobile device 1 or the MDM server may manage a container installed in the mobile device 1.

The mobile registration server 4 can perform device registration of the mobile device 1. For example, the mobile registration server 4 can perform authentication when receiving a request for registration from the mobile device 1.

The database server 5 can store data that the MDM server 3 manages. More particularly, the database server 5 can store status information of the mobile device 1 that the MDM server 3 manages. For example, the status information can be an application newly installed in the mobile device 1, and permission information that an application requires. The MDM server 3 can control such that API permissions contrary to the security policy are not provided, by using the status information of the mobile device 1 which has been read out of the database server 5.

As described above, the mobile device 1 may not provide, based on the security policy, some of the API permissions that the application requires. More particularly, the mobile device 1 does not maintain the set permission as in the related art, and can flexibly reset permission based on the received R/O, while determining whether the license key is valid.

Figure 2:
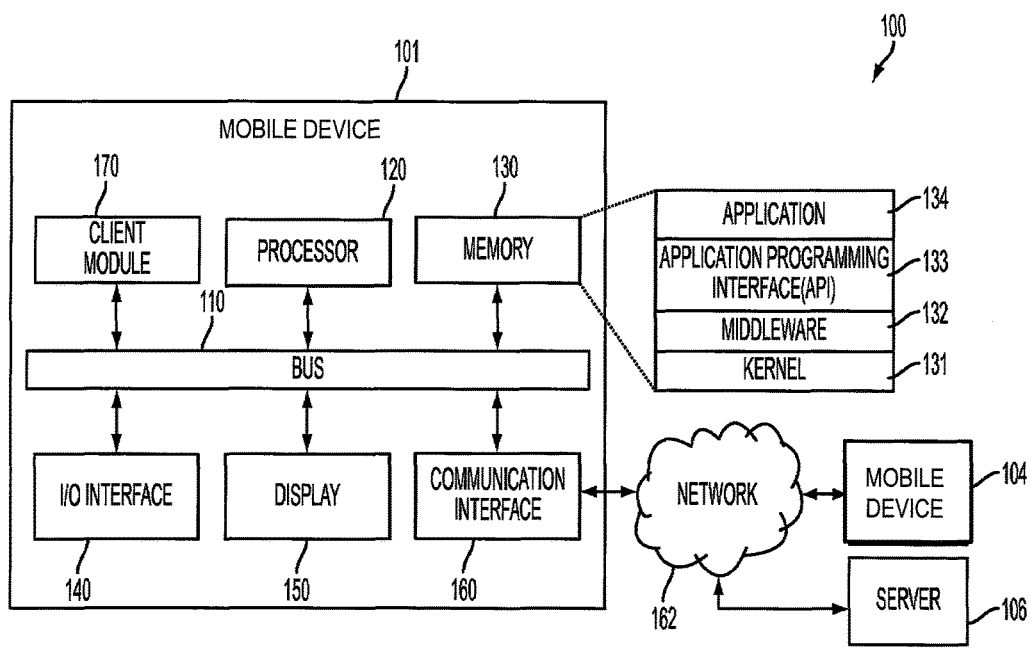
FIG. 2 illustrates an example of a network environment including an mobile device according to this disclosure.

FIG. 2 illustrates a network environment including a mobile device according to various embodiments of the present disclosure.

Referring to FIG. 2, a network environment 100 includes a mobile device 101. The mobile device 101 may include a bus 110, a processor 120, a memory 130, an Input/Output (I/O) interface 140, a display 150, a communication interface 160, a client module 170, and/or the like.

The bus 110 may be circuitry that connect the foregoing components and allow communication between the foregoing components. For example, the bus 110 may connect components of the mobile device 101 so as to allow control messages and/or other information to be communicated between the connected components.

The processor 120 may, for example, receive instructions from other components (e.g., the memory 130, the I/O interface 140, the display 150, the communication interface 160, the client module 170, and/or the like), interpret the received instructions, and execute computation or data processing according to the interpreted instructions.

The memory 130 may, for example, store instructions and/or data that are received from, and/or generated by, other components (e.g., the memory 130, the I/O interface 140, the display 150, the communication interface 160, the client module 170, and/or the like). For example, the memory 130 may include programming modules such as a kernel 131, a middleware 132, an Application Programming Interface (API) 133, an application 134, and/or the like. Each of the foregoing programming modules may include a combination of at least two of software, firmware, or hardware.

The kernel 131 may control or manage system resources (e.g., the bus 110, the processor 120, the memory 130, and/or the like) that may be used in executing operations or functions implemented in other programming modules such as, for example, the middleware 132, the API 133, the application 134, and/or the like. The kernel 131 may provide an interface for allowing or otherwise facilitating the middleware 132, the API 133, the application 134, and/or the like, to access individual components of mobile device 101.

The middleware 132 may be a medium through which the kernel 131 may communicate with the API 133, the application 134, and/or the like to send and receive data. The middleware 132 may control (e.g., by scheduling, load balancing, and/or the like) work requests by one or more applications 134. For example, the middleware 132 may control work requests by one or more applications 134 by assigning priorities for using system resources (e.g., the bus 110, the processor 120, the memory 130, and/or the like) of mobile device 101 to the one or more applications 134.

The API 133 may be an interface that may control functions that the application 134 may provide at the kernel 131, the middleware 132, and/or the like. For example, the API 133 may include at least an interface or a function (e.g., command) for file control, window control, video processing, character control, and/or the like.

According to various embodiments of the present disclosure, the application 134 may include a Short Message Service (SMS) application, a Multimedia Messaging Service (MMS) application, an email application, a calendar application, an alarm application, a health care application (e.g., an exercise amount application, a blood sugar level measuring application, and/or the like), an environmental information application (e.g., an application that may provide atmospheric pressure, humidity, temperature information, and/or the like), an instant messaging application, a call application, an interne browsing application, a gaming application, a media playback application, an image/video capture application, a file management application, and/or the like. In addition to or as an alternative to, the application 134 may be an application that is associated with information exchange between the mobile device 101 and an external mobile device (e.g., mobile device 104). As an example, the application 134 that is associated with the information exchange may include a notification relay application that may provide the external mobile device with a certain type of information, a device management application that may manage the external mobile device, and/or the like.

According to various embodiments of the present disclosure, as an example, the application 134 may include one or more applications that are determined according to a property (e.g., type of mobile device, and/or the like) of the external mobile device (e.g., the mobile device 104). According to various embodiments of the present disclosure, the application 134 may include at least one of an application that is preloaded at the mobile device 101, an application that is received from an external mobile device (e.g., the mobile device 104, a server 106, and/or the like), and/or the like.

The I/O interface 140 may, for example, receive instruction and/or data from a user. The I/O interface 140 may send the instruction and/or the data, via the bus 110, to the processor 120, the memory 130, the communication interface 160, the client module 170, and/or the like. For example, the I/O interface 140 may provide data associated with user input received via a touch screen to the processor 120. The I/O interface 140 may, for example, output instructions and/or data received via the bus 110 from the processor 120, the memory 130, the communication interface 160, the client module 170, and/or the like, via an I/O device (e.g., a speaker, a display, and/or the like). For example, the I/O interface 140 may output voice data (e.g., processed using the processor 120) via a speaker.

The display 150 may display various types of information (e.g., multimedia, text data, and/or the like) to the user. As an example, the display 150 may display a Graphical User Interface (GUI) with which a user may interact with the mobile device 101.

The communication interface 160 may provide communication between mobile device 101 and one or more external mobile devices (e.g., the mobile device 104, the server 106, and/or the like). For example, the communication interface 160 may communicate with the external mobile device by establishing a connection with a network 162 using wireless or wired communication. As an example, wireless communication with which the communication interface 160 may communicate may be at least one of, Wi-Fi®, Bluetooth®, Near Field Communication (NFC), Global Positioning System (GPS), cellular communication (e.g., Long Term Evolution (LTE), LTE Advanced (LTE-A), Code Division Multiple Access (CDMA), Wideband-CDMA (WDCMA), Universal Mobile Telecommunications System (UMTS), Wireless Broadband (WiBro), Global System for Mobile Communications (GSM), and/or the like), Infrared Data Association (IrDA) technology, and/or the like. As an example, wired communication with which the communication interface 160 may communicate may be at least one of, for example, Universal Serial Bus (USB), High Definition Multimedia Interface (HDMI), Recommended Standard 232 (RS-232), Plain Old Telephone Service (POTS), Ethernet, and/or the like.

According to various embodiments of the present disclosure, the network 162 may be a telecommunications network. As an example, the telecommunications network may include at least one of a computer network (e.g., PAN, LAN, WAN, etc.), the Internet, a telephone network, a cellular network, and/or the like. According to various embodiments of the present disclosure, a protocol (e.g., a transport layer protocol, a data link layer protocol, a physical layer protocol, and/or the like) for communicating between mobile device 101 and an external mobile device may be supported by, for example, at least one of the application 134, the API 133, the middleware 132, the kernel 131, the communication interface 160, and/or the like.

The client module 170 may, for example, process at least a part of information received from other components (e.g., the processor 120, the memory 130, the I/O interface 140, the communication interface 160, and/or the like), and provide various information, services, and/or the like to the user in various manners. For example, the client module 170 may control via the processor 120 or independently at least some of the functions of the mobile device 101 to communicate or connect to another mobile device (e.g., the mobile device 104, the server 106, and/or the like). The client module 170 may be installed or be incorporated in a mobile device (e.g., mobile devices 101, 104 or server 106) and provide functionalities for receiving a service (e.g., an MDM service) provided by a service provider.

Figure 3A:
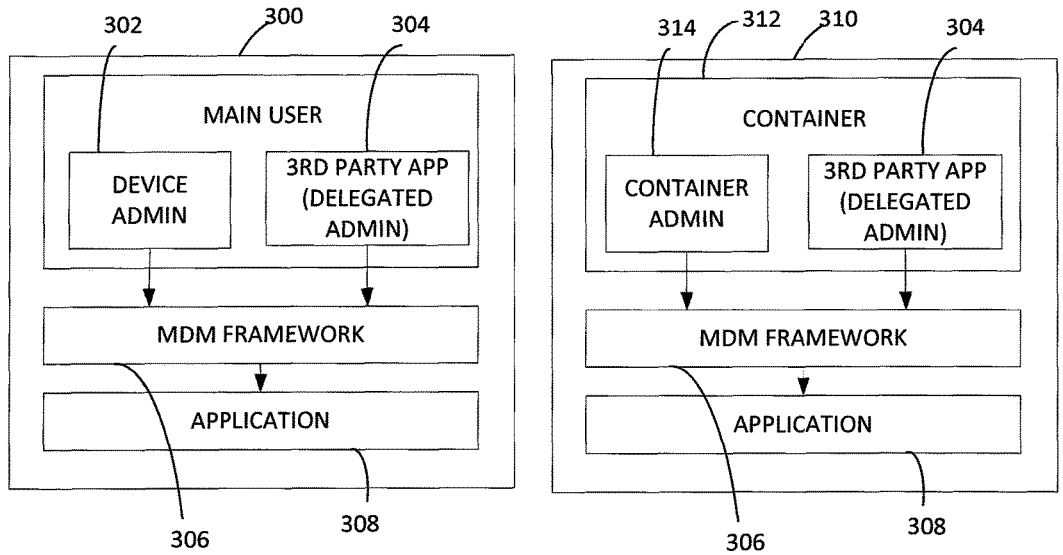
FIG. 3A illustrates examples of a mobile device according to this disclosure.

FIG. 3A illustrates two examples of a mobile device that may be used with embodiments described herein.

Referring to FIG. 3A, a mobile device 300 represents a mobile device provided by an enterprise in which the enterprise controls the security of the entire mobile device 300. Mobile device 300 includes a device administrator 302, a $3^{rd}$ party application or delegated administrator 304, and MDM framework 306, and an application 308.

Mobile device 310 represents a user's personal mobile device in which the mobile device 310 includes a container 312 having a container administrator 314. Unlike mobile device 300, the enterprise would control security of the container 312 and not the entire mobile device 310.

Figure 3B:
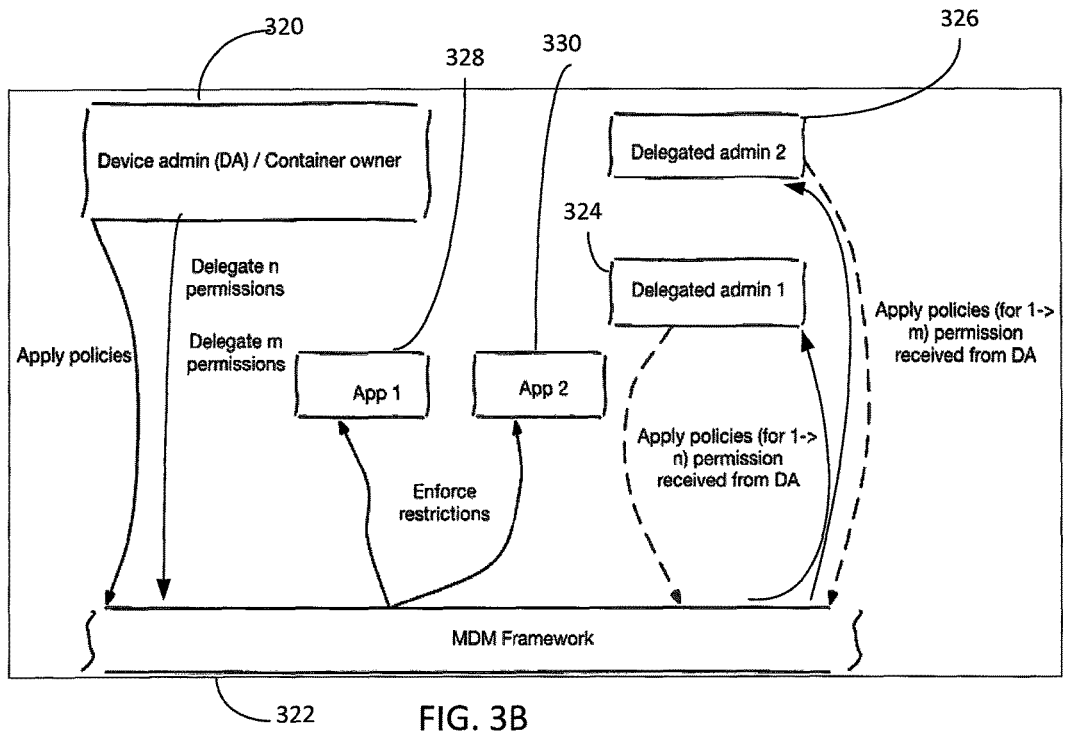
FIG. 3B illustrates an example of a permission delegation framework according to this disclosure.

FIG. 3B illustrates an example of a permission delegation framework according to this disclosure.

Referring to FIG. 3B, a device administrator (or container owner) 320, which is similar to device administrator 302 or container administrator 314, is an MDM application that is installed on the mobile device and has an activated license. The device administrator 320 may also be known as a super administrator. The device administrator 320 obtains all the permissions associated with the license. In some embodiments, the permissions may be obtained from an MDM server 3 which may be controlled by an information technology (TT) department of an enterprise. The mobile device may also have a number of $3^{rd}$ party applications installed thereon to control functions of the mobile device. The $3^{rd}$ party application or delegated administrator receives a number of permissions from the device administrator 320 through an MDM framework 322. MDM framework 322 may be implemented by one or more processors. For instance, as shown in FIG. 3B, the device administrator 320 delegates "n" permissions to delegated administrator 324 and delegates "m" permissions to delegated administrator 326 via MDM framework 322 where "n" and "m" could be any number of one or more permissions.

Once the permissions are delegated to the delegated administrators 324 and 326, the device administrator 320 and/or delegated administrators 324 and 326 may apply policies for controlling the mobile device via the MDM framework 322. By delegating the permissions to the delegated administrator, the delegated administrator may manage capabilities of the mobile device without being a device administrator or container owner and the delegated administrator would not have to activate a license. The device administrator 320 may also remove the permissions easily. The MDM framework 322 may control applications 328 and/or 330 of the mobile device based on the policies.

Although FIG. 3B illustrates two delegated administrators and two applications, any number of delegated administrators and/or applications may be installed on the mobile device.

Figure 4:
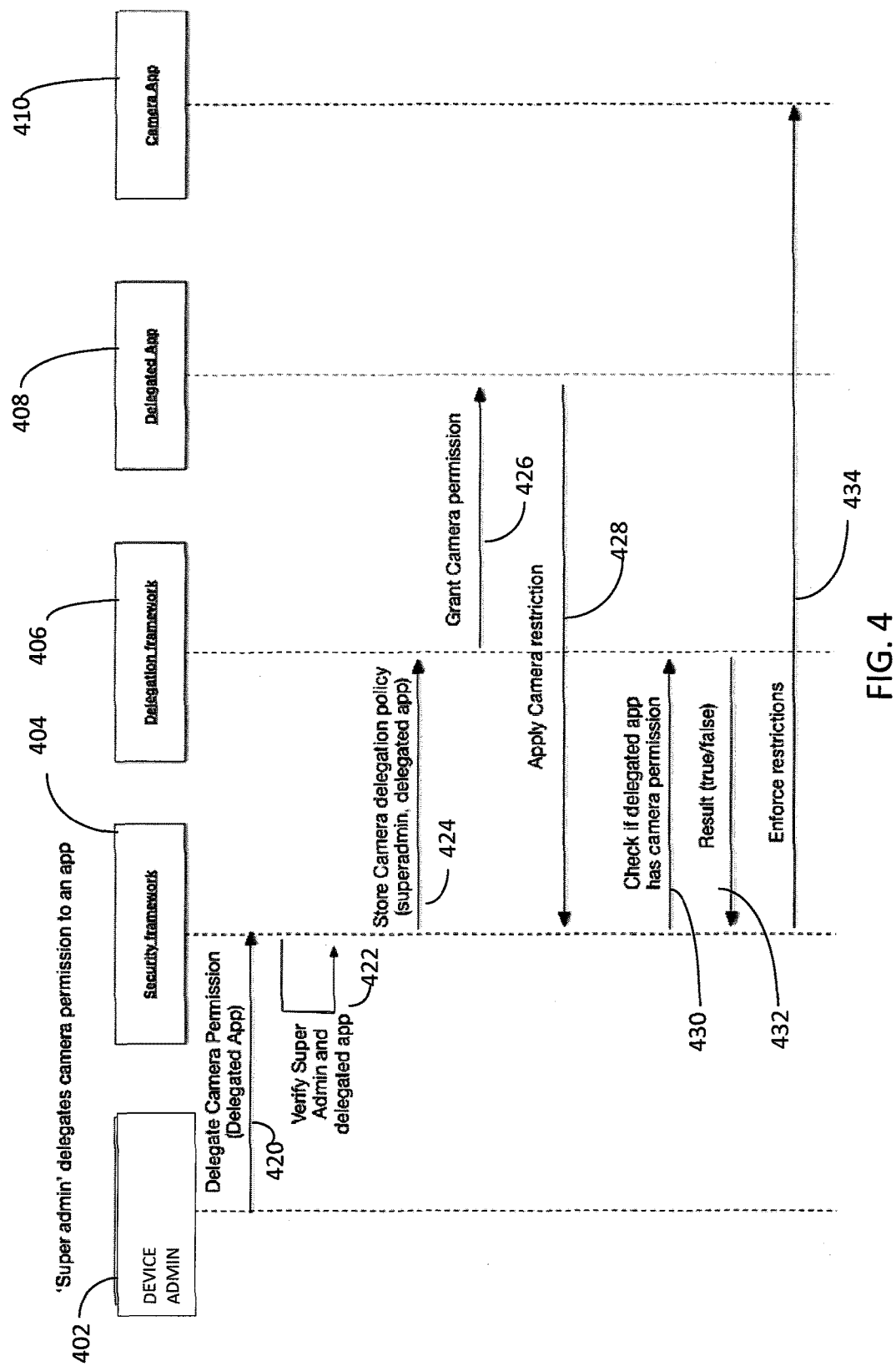
FIG. 4 illustrates an example of a process for delegating permissions according to this disclosure.

FIG. 4 illustrates an example of a process for delegating permissions according to this disclosure. The process in FIG. 4 will be explained using a camera application as merely an example. The process of FIG. 4 may be applied to any application or device included in a mobile device. As shown in FIG. 4, a device administrator 402 delegates a camera permission to a delegated administrator or application 408 by providing the permission to a security framework 404 in process 420. The security framework 404 verifies the device administrator and the delegated administrator 408 in process 422 and then provides the camera delegation policy to a delegation framework 406 in process 424. The delegation framework stores the delegation policy for the camera permission which includes information for the device administrator 402 and the delegated administrator 408. The security framework 404 and delegation framework 406 are part of the MDM framework 322 of FIG. 3. In process 426, the delegation framework 406 designates the camera permission to the delegated administrator 408. In process 428, the delegated administrator 408 applies a camera restriction policy to the security framework 404 and the security framework 404 checks with the delegation framework 406 if the delegated administrator 408 has a camera permission in process 430. The delegation framework 406 provides a result of the check to the security framework 404 in process 432. In process 434, the security framework enforces the restriction policy on the camera application 410.

Figure 5:
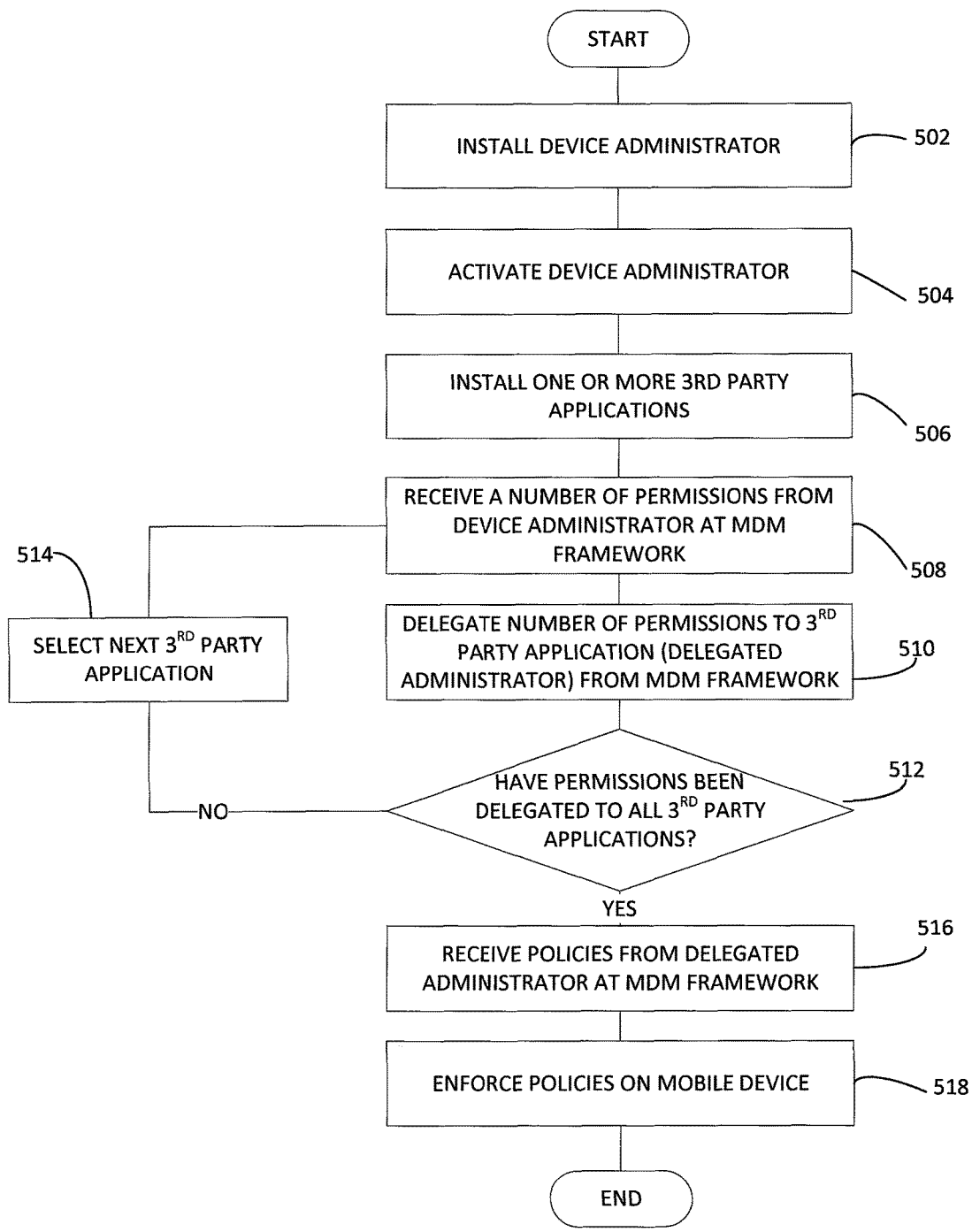
FIG. 5 illustrates a flowchart of a process for delegating and executing permissions according to this disclosure.

FIG. 5 illustrates a flowchart of a process for delegating and executing permissions according to this disclosure.

As shown in FIG. 5, an MDM application is installed as a device administrator in process 502. The device administrator or container administrator controls the overall permissions of the mobile device or container. A license is activated for the device administrator and the device administrator obtains all the permissions associated with the license in process 504. In process 506, one or more $3^{rd}$ party applications (e.g., anti-virus software, camera application, firewall application, etc.) are installed on the mobile device. In process 508, the MDM framework receives a number of permissions that will be delegated to a $3^{rd}$ party application and the MDM framework delegates the number of permissions to the $3^{rd}$ party application thereby creating a delegated administrator in process 510. In process 512, a determination is made as to whether all of the $3^{rd}$ party applications installed on the mobile device have been delegated permissions. If all of the $3^{rd}$ party applications have not been delegated permissions, the method proceeds to process 514 where the next $3^{rd}$ party application to receive permissions is selected. If all of the $3^{rd}$ party applications have delegated permissions, the MDM framework then receives one or more policies from one or more delegated administrators in process 516 and enforces the one or more policies on the mobile device in process 518. The method illustrated in FIG. 5 may be used to create any number of delegated administrators that may be installed on a mobile device.

Although FIG. 5 illustrates an example process for delegating and executing permissions, various changes may be made to FIG. 5. For example, while shown as a series of steps, various steps in FIG. 5 could be excluded, overlap, occur in parallel, occur in a different order, or occur any number of times.

Figure 6:
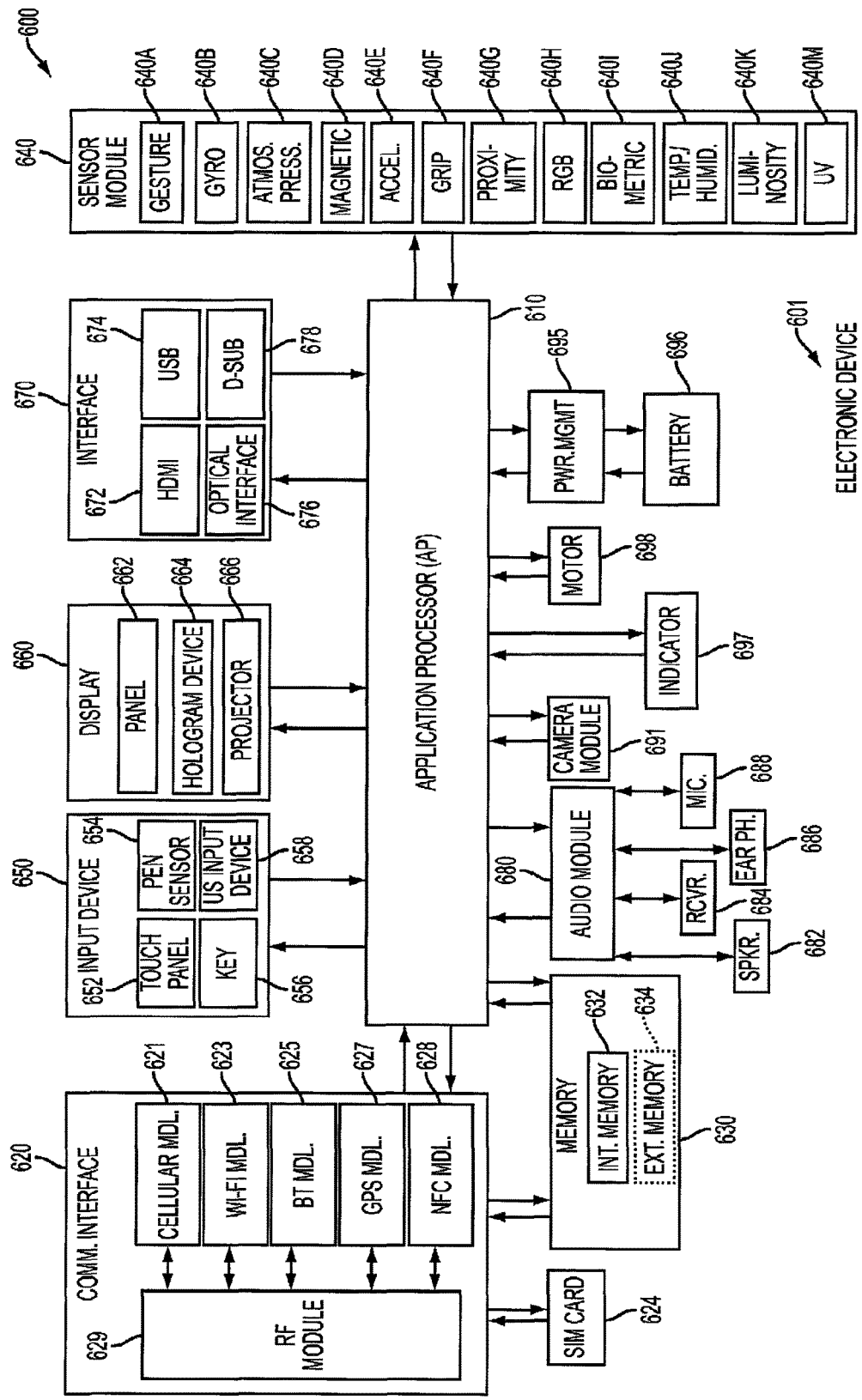
FIG. 6 illustrates a block diagram of an mobile device according to this disclosure.

FIG. 6 illustrates a block diagram of hardware according to various embodiments of the present disclosure.

Referring to FIG. 6, hardware 601 may be, for example, a part or all of the mobile device 101. Referring to FIG. 6, the hardware 601 may include one or more Application Processors (AP) 610, a communication module 620, a Subscriber Identification Module (SIM) card 624, a memory 630, a sensor module 640, an input module 650, a display module 660, an interface 670, an audio module 680, a camera module 691, a power management module 695, a battery 696, an indicator 697, a motor 698, and/or the like.

The AP 610 may control one or more hardware or software components that are connected to AP 610, perform processing or computation of data (including multimedia data), and/or the like. As an example, the AP 610 may be implemented as a System-on-Chip (SoC). The AP 610 may include a Graphics Processing Unit (GPU) (not shown).

The communication module 620 (e.g., the communication interface 160) may transmit and receive data in communications between the mobile device 101 and other mobile devices (e.g., the mobile device 104, the server 106, and/or the like). As an example, the communication module 620 may include one or more of a cellular module 621, a Wi-Fi module 623, a Bluetooth module 625, a GPS module 627, a NFC module 628, a Radio Frequency (RF) module 629, and/or the like.

The cellular module 621 may provide services such as, for example, a voice call, a video call, a Short Messaging Service (SMS), internet service, and/or the like, via a communication network (e.g., LTE, LTE-A, CDMA, WCDMA, UMTS, WiBro, GSM, and/or the like). As an example, the cellular module 621 may differentiate and authorize mobile devices within a communication network using a Subscriber Identification Module (SIM) card (e.g., the SIM card 624). According to various embodiments of the present disclosure, the cellular module 621 may perform at least a part of the functionalities of the AP 610. For example, the cellular module 621 may perform at least a part of multimedia control functionality.

According to various embodiments of the present disclosure, the communication interface 620 and/or the cellular module 621 may include a Communication Processor (CP). As an example, the cellular module 621 may be implemented as SoC.

Although FIG. 6 illustrates components such as the cellular module 621 (e.g., CP), the memory 630, the power management module 695 as components that are separate from the AP 610, according to various embodiments of the present disclosure, the AP 610 may include, or be integrated with, one or more of the foregoing components (e.g., the cellular module 621).

According to various embodiments of the present disclosure, the AP 610, the cellular module 621 (e.g., CP), and/or the like, may process instructions or data received from at least one of non-volatile memory or other components by loading in volatile memory. The AP 610, the cellular module 621, the communication interface 620, and/or the like, may store at non-volatile memory at least one of data that is received from at least one of other components or data that is generated by at least one of the other components.

Each of the Wi-Fi module 623, the Bluetooth module 625, the GPS module 627, the NFC module 628, and/or the like may, for example, include one or more processors that may process data received or transmitted by the respective modules. Although FIG. 6 illustrates the cellular module 621, the Wi-Fi module 623, the Bluetooth module 625, the GPS module 627, and the NFC module 628 as separate blocks, according to various embodiments of the present disclosure, any combination (e.g., two or more) of the cellular module 621, the Wi-Fi module 623, the Bluetooth module 625, the GPS module 627, the NFC module 628, and/or the like may be included in an Integrated Chip (IC) or an IC package. For example, at least some of the processors corresponding to the respective the cellular module 621, the Wi-Fi module 623, the Bluetooth module 625, the GPS module 627, the NFC module 628, and/or the like, may be implemented as a single SoC. For example, a CP corresponding to the cellular module 621 and a Wi-Fi processor corresponding to Wi-Fi module 623 may be implemented as a single SoC.

The RF module 629 may, for example, transmit and receive RF signals. Although not shown, the RF module 629 may include a transceiver, a Power Amp Module (PAM), a frequency filter, a Low Noise Amplifier (LNA), and/or the like. The RF module 629 may include one or more components for transmitting and receiving Electro-Magnetic (EM) waves (e.g., in free space or the like) such as, for example, conductors or conductive wires. Although FIG. 6 illustrates that the cellular module 621, the Wi-Fi module 623, the Bluetooth module 625, the GPS module 627, and the NFC module 628 are sharing one RF module 629, according to various embodiments of the present disclosure, at least one of the cellular module 621, the Wi-Fi module 623, the Bluetooth module 625, the GPS module 627, the NFC module 628, and/or the like may transmit and receive RF signals via a separate RF module.

The SIM card 624 may be a card implementing a SIM, and may be configured to be inserted into a slot disposed at a specified location of the mobile device. The SIM card 624 may include a unique identifier (e.g., Integrated Circuit Card IDentifier (ICCID)) subscriber information (e.g., International Mobile Subscriber Identity (IMSI)), and/or the like.

The memory 630 (e.g., memory 130) may include an internal memory 632, an external memory 634, or a combination thereof.

According to various embodiments of the present disclosure, the internal memory 632 may be, for example, at least one of volatile memory (e.g., Dynamic Random Access Memory (DRAM), Static Random Access Memory (SRAM) or Synchronous Dynamic Random Access Memory (SDRAM)), non-volatile memory (e.g., One Time Programmable Read Only Memory (OTPROM), Programmable Read Only Memory (PROM), Erasable and Programmable Read Only Memory (EPROM), Electrically Erasable and Programmable Read Only Memory (EEPROM), mask Read Only Memory (ROM), flash ROM, NAND flash memory, NOR flash memory), and/or the like.

According to various embodiments of the present disclosure, the internal memory 632 may be a Solid State Drive (SSD). As an example, the external memory 634 may be a flash drive (e.g., Compact Flash (CF drive), Secure Digital (SD), micro Secure Digital (micro-SD), mini Secure Digital (mini-SD), extreme Digital (xD), Memory Stick, and/or the like). The external memory 634 may be operatively coupled to hardware 601 via various interfaces. According to various embodiments of the present disclosure, the hardware 601 may include recording devices (or recording media) such as, for example, Hard Disk Drives (HDD), and/or the like.

The sensor module 640 may measure physical/environmental properties detect operational states associated with hardware 601, and/or the like, and convert the measured and/or detected information into signals such as, for example, electric signals or electromagnetic signals. As an example, the sensor module 640 may include at least one of a gesture sensor 640A, a gyro sensor 640B, an atmospheric pressure sensor 640C, a magnetic sensor 640D, an accelerometer 640E, a grip sensor 640F, a proximity sensor 640G, an RGB sensor 640H, a biometric sensor 640I, a temperature/humidity sensor 640J, a luminosity sensor 640K, a Ultra Violet (UV) sensor 640M, and/or the like. The sensor module 640 may detect the operation state of the mobile device and/or measure physical properties, and convert the detected or measured information into electrical signals. Additionally or alternatively, the sensor module 640 may also include, for example, an electrical-nose sensor (not shown), an electromyography (EMG) sensor (not shown), an electroencephalogram (EEG) sensor (not shown), an infrared (IR) sensor (not shown), an eye-scanning sensor (e.g., iris sensor) (not shown), a fingerprint sensor, and/or the like. The sensor module 640 may also include control circuitry for controlling one or more sensors included therein.

The input module 650 may include a touch panel 652, a (digital) pen sensor 654, a key 656, an ultrasonic input device 658, and/or the like.

As an example, the touch panel 652 may detect touch input using capacitive, resistive, infrared, ultrasonic methods, and/or the like. The touch panel 652 may also include a touch panel controller (not shown). As an example, a capacitive-type touch panel may detect proximity inputs (e.g. hovering input) in addition to, or as an alternative to, physical touch inputs. The touch panel 652 may also include a tactile layer. According to various embodiments of the present disclosure, the touch panel 652 may provide haptic feedback to the user using the tactile layer.

As an example, the (digital) pen sensor 654 may be implemented using methods identical to or similar to receiving a touch input from a user, or using a separate detection sheet (e.g., a digitizer).

As an example, the key 656 may be a keypad, a touch key, and/or the like.

As an example, the ultrasonic input device 658 may be a device configured to identify data by detecting, using a microphone (e.g., microphone 688), ultrasonic signals generated by a device capable of generating the ultrasonic signal. The ultrasonic input device 658 may detect data wirelessly.

According to various embodiments of the present disclosure, the hardware 601 may receive user input from an external device (e.g., a network, computer or server) connected to the hardware 601 using the communication module 620.

The display module 660 (e.g., display 150) may include a panel 662, a hologram device 664, a projector 666, and/or the like. As an example, the panel 662 may be, for example, a Liquid-Crystal Display (LCD), an Active-Matrix Organic Light-Emitting Diode (AM-OLED) display, and/or the like. As an example, the panel 662 may be configured to be flexible, transparent, and/or wearable. The panel 662 and the touch panel 652 may be implemented as a single module. The hologram device 664 may provide a three-dimensional image. For example, the hologram device 664 may utilize the interference of light waves to provide a three-dimensional image in empty space. The projector 666 may provide image by projecting light on a surface (e.g., a wall, a screen, and/or the like). As an example, the surface may be positioned internal or external to hardware 601. According to various embodiments of the present disclosure, the display module 660 may also include a control circuitry for controlling the panel 662, the hologram device 664, the projector 666, and/or the like.

The interface 670 may include, for example, one or more interfaces for a High-Definition Multimedia Interface (HDMI) 672, a Universal Serial Bus (USB) 674, a projector 676, or a D-subminiature (D-sub) 678, and/or the like. As an example, the interface 670 may be part of the communication interface 620. Additionally or alternatively, the interface 670 may include, for example, one or more interfaces for Mobile High-definition Link (MHL), Secure Digital (SD)/MultiMedia Card (MMC), Infrared Data Association (IrDA), and/or the like.

The audio module 680 may encode/decode sound into electrical signal, and vice versa. According to various embodiments of the present disclosure, at least a portion of audio module 680 may be part of the I/O interface 140. As an example, the audio module 680 may encode/decode voice information that is input into, or output from, the speaker 682, the receiver 684, the earphone 686, the microphone 688, and/or the like.

The camera module 691 may capture still images and/or video. According to various embodiments of the present disclosure, the camera module 691 may include one or more image sensors (e.g., front sensor module, rear sensor module, and/or the like) (not shown), an Image Signal Processor (ISP) (not shown), or a flash (e.g., Light-Emitting Diode (flash LED), xenon lamp, and/or the like) (not shown).

The power management module 695 may manage electrical power of the hardware 601. Although not shown, the power management module 695 may include, for example, a Power Management Integrated Circuit (PMIC), a charger Integrated Circuit (charger IC), a battery gauge, a fuel gauge, and/or the like.

As an example, the PMIC may be disposed in an integrated circuit or an SoC semiconductor. The charging method for the hardware 601 may include wired or wireless charging. The charger IC may charge a battery, may prevent excessive voltage or excessive current from a charger from entering the hardware 601, and/or the like. According to various embodiments of the present disclosure, the charger IC may include at least one of a wired charger IC or a wireless charger IC. As an example, the wireless charger IC may be a magnetic resonance type, a magnetic induction type, an electromagnetic wave type, and/or the like. As an example, the wireless charger IC may include circuits such as a coil loop, a resonance circuit, a rectifier, and/or the like.

As an example, the battery gauge may measure a charge level, a voltage while charging, a temperature of battery 696, and/or the like.

As an example, the battery 696 may supply power to the hardware 601. As an example, the battery 696 may be a rechargeable battery, a solar battery, and/or the like.

The indicator 697 may indicate one or more states (e.g., boot status, message status, charge status, and/or the like) of the hardware 601 or a portion thereof (e.g., AP 610). Motor 698 may convert an electrical signal into a mechanical vibration.

Although not shown, the hardware 601 may include one or more devices for supporting mobile television (mobile TV) (e.g., a Graphics Processing Unit (GPU)), and/or the like. The devices for supporting mobile TV may support processing of media data compliant with, for example, Digital Multimedia Broadcasting (DMB), Digital Video Broadcasting (DVB), media flow, and/or the like.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A mobile device comprising:
   a memory configured to store:
      a device administrator configured to obtain at least one permission associated with a license and delegate the at least one permission to at least one delegated administrator by providing the at least one delegated permission to a mobile device management (MDM) framework, and
      the at least one delegated administrator configured to apply a policy based on the at least one delegated permission to the MDM framework; and
   at least one processor configured to execute the MDM framework that is configured to:
      receive the at least one delegated permission from the device administrator;
      grant the at least one delegated permission to the at least one delegated administrator;
      receive the applied policy from the at least one delegated administrator; and
      enforce the applied policy on the mobile device.

2. The mobile device of claim 1, wherein:
   the at least one delegated administrator includes a first delegated administrator and a second delegated administrator, and
   the at least one permission includes:
      a first number of permissions that are delegated to the first delegated administrator; and
      a second number of permissions that are delegated to the second delegated administrator.

3. The mobile device of claim 1, wherein the delegated administrator is an application stored on the mobile device.

4. The mobile device of claim 1, wherein the device administrator is configured to receive the at least one permission from an MDM server.

5. The mobile device of claim 1, further comprising a container including a container owner configured to provide the at least one permission to the MDM framework.

6. The mobile device of claim 5, wherein the container owner is configured to receive the at least one permission from an MDM server.

7. A method for managing a mobile device using a mobile device management (MDM) framework, the method comprising:
   obtaining, by a device administrator, at least one permission associated with a license;
   delegating, by the device administrator, the at least one obtained permission to at least one delegated administrator through the MDM framework;
   receiving, by the MDM framework, the at least one delegated permission from the device administrator;
   grant, by the MDM framework, the at least one delegated permission to the at least one delegated administrator;
   applying, by the at least one delegated administrator, a policy based on the at least one delegated permission to the MDM framework;
   receiving, by the MDM framework, the applied policy from the at least one delegated administrator; and
   enforcing, by the MDM framework, the applied policy on the mobile device.

8. The method of claim 7, wherein delegating the at least one obtained permission to at least one delegated administrator through the MDM framework includes:
   delegating a first number of permissions to a first delegated administrator; and
   delegating a second number of permissions to a second delegated administrator.

9. The method of claim 7, wherein the delegated administrator is an application stored on the mobile device.

10. The method of claim 7, wherein the device administrator is configured to receive the at least one permission from an MDM server.

11. The method of claim 7, wherein the mobile device includes a container and the at least one permissions is obtained from a container owner configured to provide the at least one permission to the MDM framework.

12. The method of claim 11, wherein the container owner is configured to receive the at least one permission from an MDM server.

13. A non-transitory computer-readable medium comprising instructions stored thereon executable by at least one processor for managing a mobile device using a mobile device management (MDM) framework, to the instructions including:
   obtain, by a device administrator, at least one permission associated with a license;
   delegate, by the device administrator, the at least one obtained permission to at least one delegated administrator through the MDM framework;
   receiving, by the MDM framework, the at least one delegated permission from the device administrator;
   grant, by the MDM framework, the at least one delegated permission to the at least one delegated administrator;
   apply, by the at least one delegated administrator, a policy based on the at least one delegated permission to the MDM framework;
   receiving, by the MDM framework, the applied policy from the at least one delegated administrator; and
   enforce, by the MDM framework, the applied policy on the mobile device.

14. The non-transitory computer-readable medium of claim 13, wherein delegating the at least one obtained permission to at least one delegated administrator through the MDM framework includes:
   delegating a first number of permissions to a first delegated administrator; and
   delegating a second number of permissions to a second delegated administrator.

15. The non-transitory computer-readable medium of claim 13, wherein the delegated administrator is an application stored on the mobile device.

16. The non-transitory computer-readable medium of claim 13, wherein the device administrator is configured to receive the at least one permission from an MDM server.

17. The non-transitory computer-readable medium of claim 13, wherein the mobile device includes a container and the MDM framework receives the at least one permission from a container owner.

18. The mobile device of claim 1, wherein the MDM framework is further configured to determine whether the at least one delegated permission corresponds to the applied policy.

19. The method of claim 7, further comprising determining whether the at least one delegated permission corresponds to the applied policy.

20. The non-transitory computer-readable medium of claim 13, the instructions for including determining whether the at least one delegated permission corresponds to the applied policy.

* * * * *